(12) United States Patent
Saunders et al.

(10) Patent No.: US 12,146,576 B2
(45) Date of Patent: Nov. 19, 2024

(54) PISTON FOR ADJUSTABLE PRESSURE REDUCING VALVE AND AN ADJUSTABLE PRESSURE REDUCING VALVE

(71) Applicant: PALAMAR INDUSTRIES INC., Burlington (CA)

(72) Inventors: Jeffrey Saunders, Hamilton (CA); William Palamar, Burlington (CA)

(73) Assignee: PALAMAR INDUSTRIES INC., Burlington (CA)

( * ) Notice: Subject to any disclaimer, the term of this patent is extended or adjusted under 35 U.S.C. 154(b) by 35 days.

(21) Appl. No.: 18/311,423

(22) Filed: May 3, 2023

(65) Prior Publication Data

US 2023/0358334 A1    Nov. 9, 2023

Related U.S. Application Data

(60) Provisional application No. 63/339,718, filed on May 9, 2022.

(51) Int. Cl.

| F16K 17/00 | (2006.01) |
|---|---|
| F16K 31/122 | (2006.01) |
| G05D 16/10 | (2006.01) |
| F16K 31/60 | (2006.01) |
| F16K 41/16 | (2006.01) |

(52) U.S. Cl.
CPC .......... *F16K 17/00* (2013.01); *F16K 31/1221* (2013.01); *F16K 31/1223* (2013.01); *G05D 16/103* (2013.01); *F16K 31/60* (2013.01); *F16K 41/16* (2013.01)

(58) Field of Classification Search
CPC .. F16K 17/00; F16K 31/1223; F16K 31/1221; F16K 41/04; F16K 41/16; G05D 16/103
See application file for complete search history.

(56) References Cited

U.S. PATENT DOCUMENTS

| 193,604 | A | * | 7/1877 | Hanning | .............. | G05D 16/103 |
|---|---|---|---|---|---|---|
| | | | | | | 137/505.25 |
| 585,377 | A | * | 6/1897 | Craig | .................... | F16K 31/363 |
| | | | | | | 251/26 |

(Continued)

FOREIGN PATENT DOCUMENTS

WO    2006060164 A2    6/2006

*Primary Examiner* — Umashankar Venkatesan
(74) *Attorney, Agent, or Firm* — Westman, Champlin & Kochler, P.A.

(57) ABSTRACT

A piston for a pressure-reducing valve includes a tubular housing having an internal longitudinal bore extending from a first end to a second end. An exterior circumferential sealing disc sealing engages internal walls. The sealing disc has upper and lower faces generally perpendicular to a longitudinal axis. First fluid port(s) and second fluid port(s) extend through the tubular housing and into the longitudinal bore. A piston stem sealingly engages an internal surface of the longitudinal bore between the sealing disc and the second end to prevent the passage of fluid. The piston stem, together with a portion of the longitudinal bore, forms fluid passageway(s) that fluidly connect the first fluid port(s) with the second fluid port(s). The second fluid port(s) are inclined relative to the longitudinal axis and extend through at least a portion of the sealing disc, intersecting at least a portion of the upper face thereof.

14 Claims, 6 Drawing Sheets

(56) References Cited

U.S. PATENT DOCUMENTS

| | | | | |
|---|---|---|---|---|
| 744,777 | A | * | 11/1903 | Martin ............... F16K 17/00 251/38 |
| 882,798 | A | * | 3/1908 | Reid .................. F16K 17/00 251/38 |
| 3,862,738 | A | * | 1/1975 | Stumpmeier ........ F16K 31/383 251/44 |
| 3,946,756 | A | * | 3/1976 | Specht ................ F16K 31/145 251/285 |
| 4,309,021 | A | * | 1/1982 | Hafele ............... F16K 31/1221 251/36 |
| 5,899,435 | A | * | 5/1999 | Mitsch ................ F16K 25/00 251/282 |
| 7,320,333 | B2 | | 1/2008 | Trapp et al. |
| 10,900,586 | B2 | * | 1/2021 | McDoneld ............ F16K 41/04 |
| 2002/0088961 | A1 | * | 7/2002 | Yang .................. F16K 41/04 251/214 |
| 2006/0112994 | A1 | * | 6/2006 | Trapp ................. F16K 31/143 137/495 |
| 2022/0347911 | A1 | * | 11/2022 | Schmidt ............. F16K 31/1226 |
| 2023/0228342 | A1 | * | 7/2023 | Shimada ............. F16K 31/1221 251/63.5 |

\* cited by examiner

PISTON FOR ADJUSTABLE PRESSURE REDUCING VALVE AND AN ADJUSTABLE PRESSURE REDUCING VALVE

CROSS-REFERENCE TO RELATED APPLICATION(S)

This application claims the benefit of U.S. provisional patent application Ser. No. 63/339,718, filed on May 9, 2022.

FIELD

This invention relates generally to the field of adjustable pressure reducing valves, and in one embodiment to an adjustable pressure reducing valve that is particularly useful in fire protection applications, and to an improved piston for use in such valves.

BACKGROUND

Many jurisdictions mandate the inclusion of a fire protection system within industrial buildings and high-rise or multi-storey residential construction. Typically, such fire protection systems comprise a series of sprinkler heads distributed throughout the building and connected to a source of pressurized water that can be accessed to help extinguish flames in the event of a fire. Commonly such systems also include dedicated fire hoses that are stored on racks within wall cabinets located in a stairwell, hallway, or other centralized area. In some instances, the fire protection system may also include a dedicated fire department connection or hydrant, which a fire department may access as a source of pressurized water in the event of a fire.

The pressures within the piping of a fire protection system can vary dramatically and at times can exceed those that are safely accommodated by a fire hose that is either permanently mounted in the building within a hose cabinet, or that is connected to the fire protection system by a fire department. For example, in the case of a high-rise building, the pressure within a riser pipe that supplies pressurized water to the various floors of the building can be considerable on lower floors as it must ensure that water of a sufficient pressure is supplied to the upper floors of the building. In such cases, pressures of 400 psi are possible. In other instances, where water must be supplied to remote locations in a large single-story industrial setting, the pressure at the input end of the fire protection system may need to be significant to overcome frictional losses and to ensure that there is sufficient pressure at the opposite end of the system. In either instance, the necessity to maintain a high pressure in particular portions of the piping of a fire protection system can result in pressures that can exceed the safe allowable pressure ratings for fire hoses and other equipment that may be connected to the fire protection system. At times, the pressures could also exceed safe operating pressures for sprinkler heads that are connected to supply lines that are exposed to considerable pressure.

To accommodate such instances of excess pressure, fire protection systems typically incorporate a pressure reducing valve that regulates water pressure supplied to a particular piping system or fire protection system component. Commonly, such pressure reducing valves are adjustable, presenting an ability to make adjustments to the valve in order to present an output pressure within a desired range for the application at hand.

The pressures within piping of a fire protection system can also vary at times, requiring pressure reducing valves to react quickly in order to prevent an over pressuring of system components. A pressure reducing valve that rapidly adjusts valve is also necessary in order to ensure that there is sufficient output pressure/flow from the valve in order to adequately supply downstream fire protection equipment. The reaction rates of currently available pressure reducing valves are limited by their design, which can lead to a wider range of maximum and minimum operating pressures than may be desired.

In some applications, the pressure reducing valve of a fire protection system may be exposed to freezing temperatures. Currently available valves typically result in a pooling of water within their internal structures when the valve is in a closed configuration. Where the valve is then exposed to freezing temperatures, that pooled water can freeze, potentially causing a failure of the valve or preventing water flow in the case of a fire situation.

There is therefore a need for an adjustable pressure reducing valve that is capable of rapidly responding to fluctuations in pressure during operation and that is self-draining to avoid ice formation if exposed to freezing temperatures. It is also desirable for such valves to be robust and have a high structural strength to ensure years of high confidence operation. Pressure reducing valves will also preferably be formed in a manner that helps to limit the chance of debris clogging ports and internal passageways that may deleteriously affect operation.

SUMMARY

In an embodiment there is provided a piston for a pressure-reducing valve, the piston comprising a tubular housing having an internal longitudinal bore extending from a first end to a second end, an exterior circumferential sealing disc positioned along the length of the tubular housing at a distance from the first and the second ends, the sealing disc for sealing engagement with internal walls of a correspondingly shaped internal pressure chamber of the pressure reducing valve, the sealing disc having an upper face and a lower face, the upper and lower face being generally perpendicular to the longitudinal axis of the tubular housing, one or more first fluid ports extending through the tubular housing and into the longitudinal bore at a position between the sealing disc and the first end, and one or more second fluid ports extending through the tubular housing and into the longitudinal bore at a position between the sealing disc and the second end, wherein the longitudinal bore of the tubular housing is dimensioned to receive a piston stem therein, when received within the longitudinal bore the piston stem sealingly engaging an internal surface of the longitudinal bore between the sealing disc and the second end so as to prevent the passage of fluid therebetween, when received within the longitudinal bore the piston stem, together with a portion of the internal surface of the longitudinal bore, forming one or more fluid passageways therebetween, fluidly connecting the one or more first fluid ports with the one or more second fluid ports, wherein the second fluid ports are inclined relative to the longitudinal axis of the tubular housing and extend through at least a portion of the sealing disc, intersecting at least a portion of the upper face of the sealing disc.

In an embodiment, the intersection of the sealing disc with the tubular housing includes one or more gussets at the location where the one or more second fluid ports intersect the upper face of the sealing disc. The gussets may extend between the tubular housing and the upper face of the sealing disc providing structural rigidity to the sealing disc at the position of intersection by the one or more second fluid ports and helping to resist deflection of the sealing disc relative to the tubular housing.

There is also provided a combination of a piston and a piston stem wherein the piston stem has a tapered face on an exterior surface that aligns adjacently with the one or more first fluid ports when the piston stem is received within the tubular housing, the tapered face assisting in directing the flow of fluid between the one or more first fluid ports and the one or more second fluid ports.

An embodiment of the invention further provides a pressure reducing valve comprising the piston described herein.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

The present invention may be embodied in a number of different forms. The specification and drawings that follow describe and disclose some of the specific forms of the invention.

With reference to the attached Figures there is shown a pressure reducing valve 1 containing components assembled in accordance with an embodiment of the invention. From a thorough understanding of the invention it will be appreciated that many of the components that comprise valve 1 will be relatively standard components that are common to many valves, including pressure reducing valves. Many of the components of valve 1, and their function, will therefore be known to one of ordinary skill in the art.

Pressure reducing valve 1 is generally comprised of a valve body 2 having a fluid input 3 and a fluid output 4. Typically, the upper portion of valve body 2 will be fitted with a bonnet 5 within which will be housed much of the workings of the pressure reducing system or structure that is employed. Commonly, bonnet 5 will have positioned within it a pressure chamber 6 within which a piston 7, constructed in accordance with the invention, is at least partially situated. As in the case of many such pressure reducing valves, there will further be included a spring 8 and a spring controller/tensioner 9 that can be manipulated to increase or decrease the force applied by spring 8 to piston 7 in order to regulate the pressure of fluid that is allowed to flow between input 3 and output 4. A handle stem 10 would typically be rotated through the use of a handle or handwheel 11 in order to "open" and "close" the valve. The overall or general operation of valve 1 is not unlike other prior art pressure reducing valves, including that described in U.S. Pat. No. 7,320,333. It is expected that one of ordinary skill in the art, to which this specification is directed, would appreciate and understand the structure, function and operation of currently available pressure reducing valves, including that described in U.S. Pat. No. 7,320,333.

In accordance with the invention, piston 7 comprises a tubular housing 12 having an internal longitudinal bore 13 extending from a first end 14 (in the orientation shown, the bottom end) to a second end 15 (in the orientation shown, the top end). A circumferential sealing disc 16 is positioned along the length of tubular housing 12 part-way between first and second ends 14 and 15. Disc 16 has an upper face 17 and a lower face 18 that are generally perpendicular to the longitudinal axis of tubular housing 12. As will be appreciated, disc 16 is designed for sealing engagement with the internal walls of pressure chamber 6 to effectively divide the pressure chamber into an upper sealed portion 19 and a lower sealed portion 20. A seal 21 (which may comprise an O-ring or other form of seal) may be positioned about the circumference of disc 16 to seal between the disc and the side surface of chamber 6. It will further be appreciated that disc 16 would typically be circular in nature.

Tubular housing 12 contains one or more first fluid ports 22 extending through the tubular housing and into its longitudinal bore at a position between disc 16 and first end 14. Commonly, first fluid ports 22 would be positioned at or close to first end 14. Tubular housing 12 further includes one or more second fluid ports 23 extending through the tubular housing and into its longitudinal bore at a position between disc 16 and second end 15. In accordance with an embodiment of the invention, second fluid ports 23 are inclined relative to the longitudinal axis of tubular housing 12 and are located such that they extend through at least a portion of disc 16, intersecting upper face 17 of disc 16. In one embodiment, second fluid ports 23 intersect the upper face 17 of disc 16 at or adjacent to the juncture between disc 16 and tubular housing 12.

Figure 1:
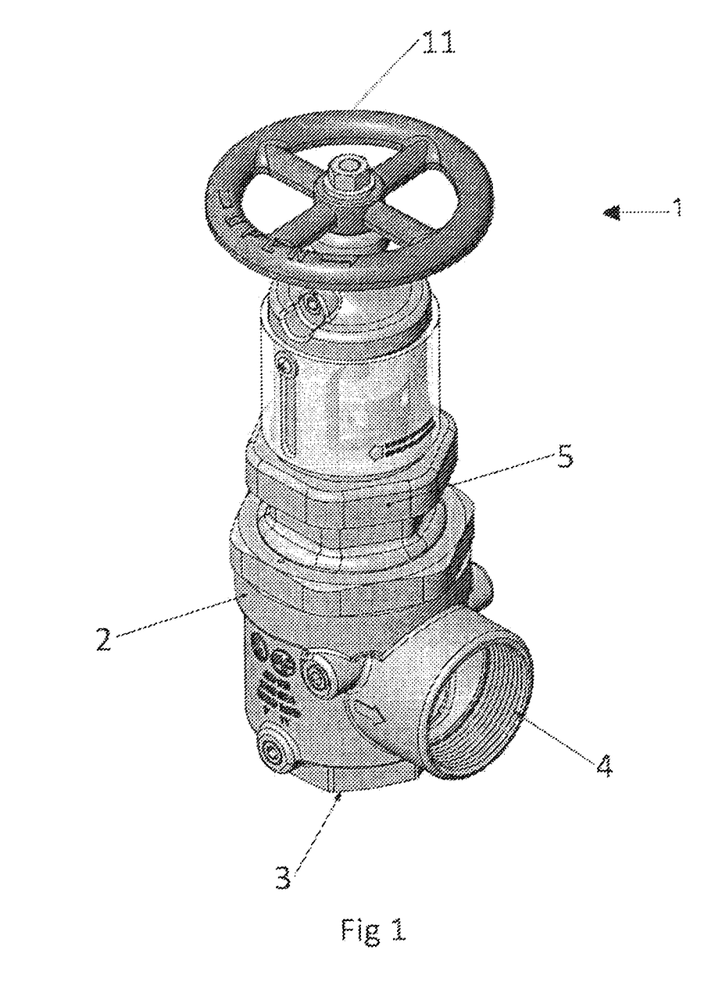
FIG. 1 is an upper side perspective view of an adjustable pressure control valve constructed in accordance with an embodiment of the invention.
Figure 2:
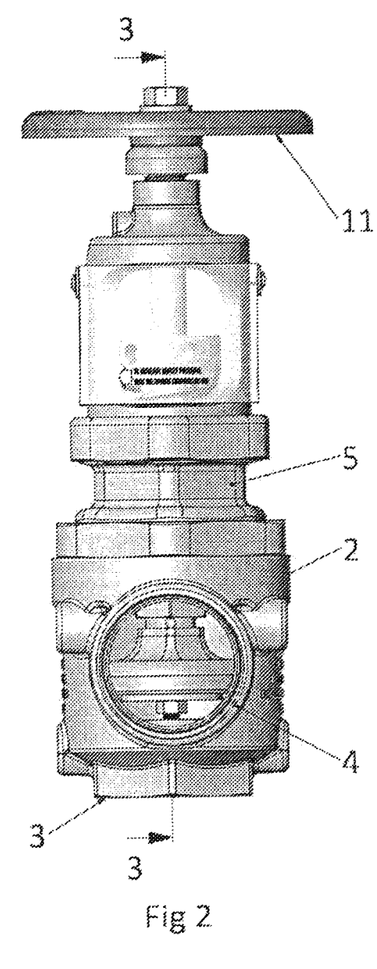
FIG. 2 is a right side view of the valve shown in FIG. 1.
Figure 3:
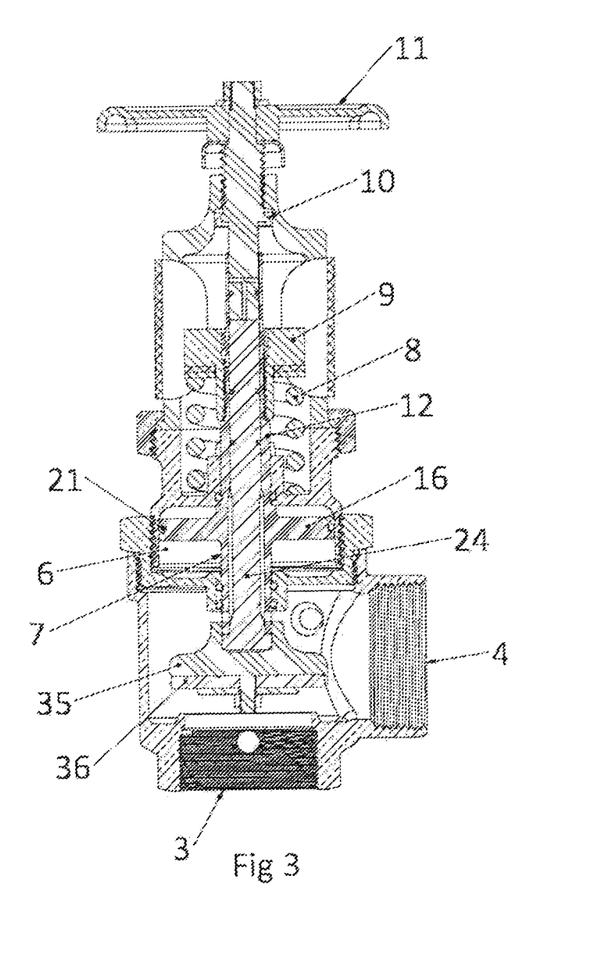
FIG. 3 is a sectional view taken along the line 3-3 of FIG. 2, wherein the valve is in an open position.
Figure 4:
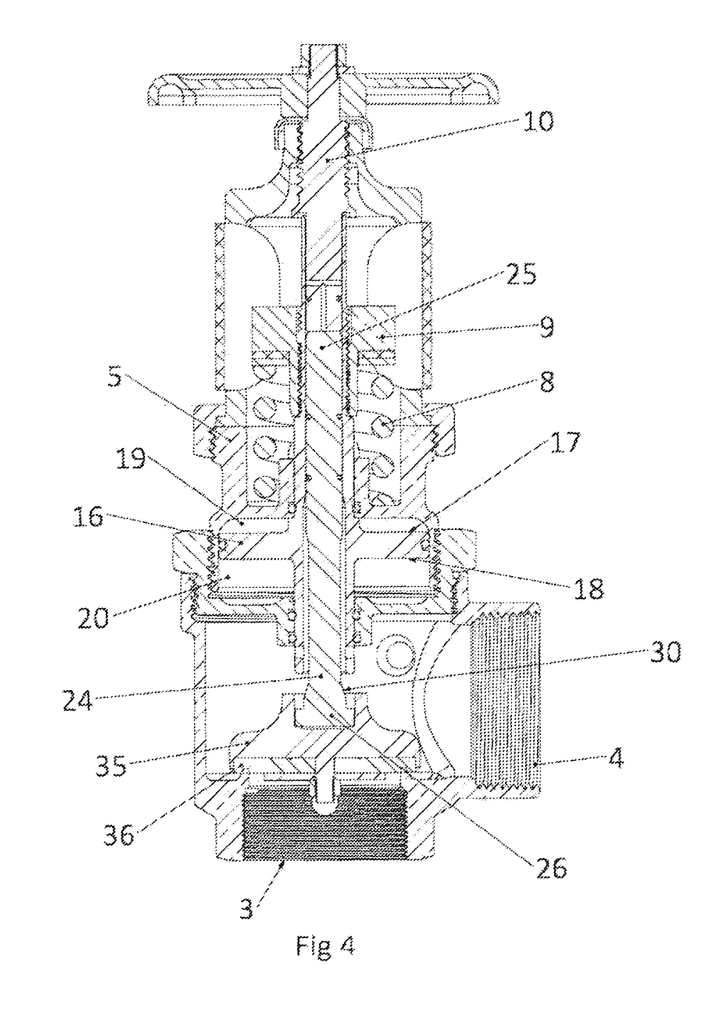
FIG. 4 is a few similar to FIG. 3, wherein the valve is in a closed position.
Figure 5:
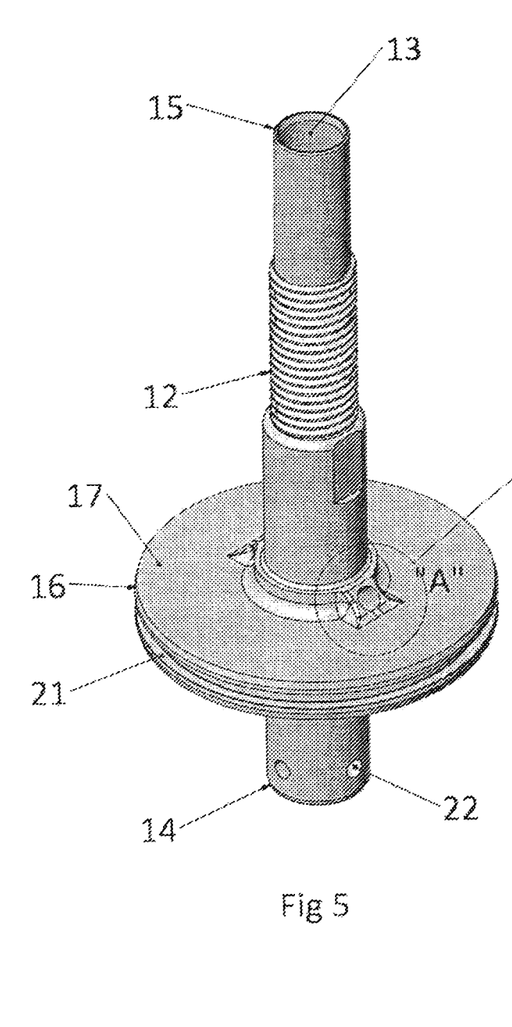
FIG. 5 is an upper side perspective view of the piston of the valve shown in FIG. 1.
Figure 6:
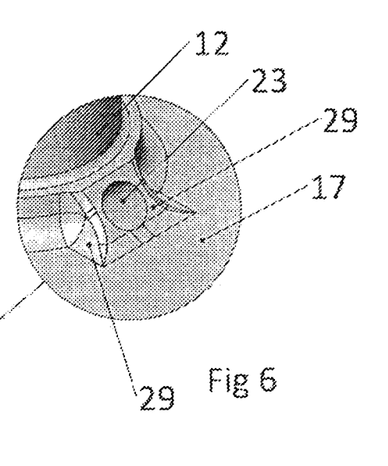
FIG. 6 is an enlarged detail view of area "A" of FIG. 5.
Figure 7:
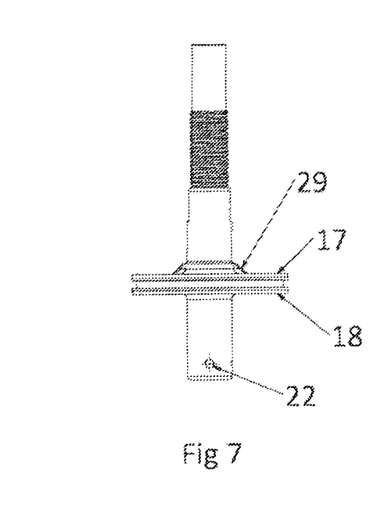
FIG. 7 is a front elevational view of the piston shown in FIG. 5.
Figure 8:
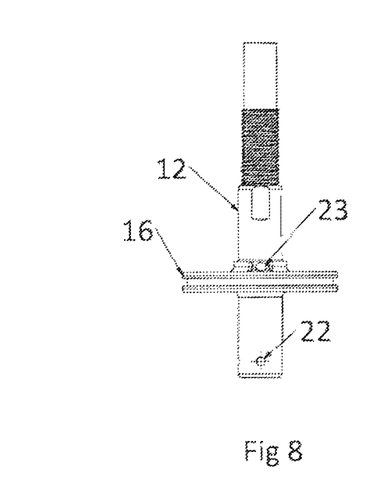
FIG. 8 is a left side elevational view of the piston shown in FIG. 5.
Figure 9:
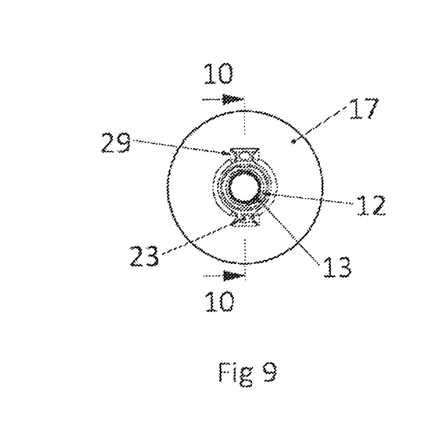
FIG. 9 is a top view of the piston shown in FIG. 5.
Figure 10:
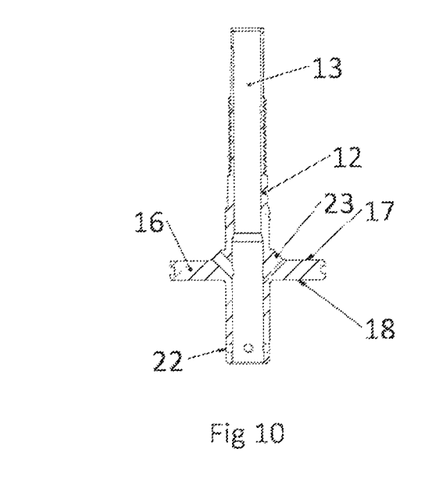
FIG. 10 is a sectional view taken along the line 10-10 of FIG. 9.
Figure 11:
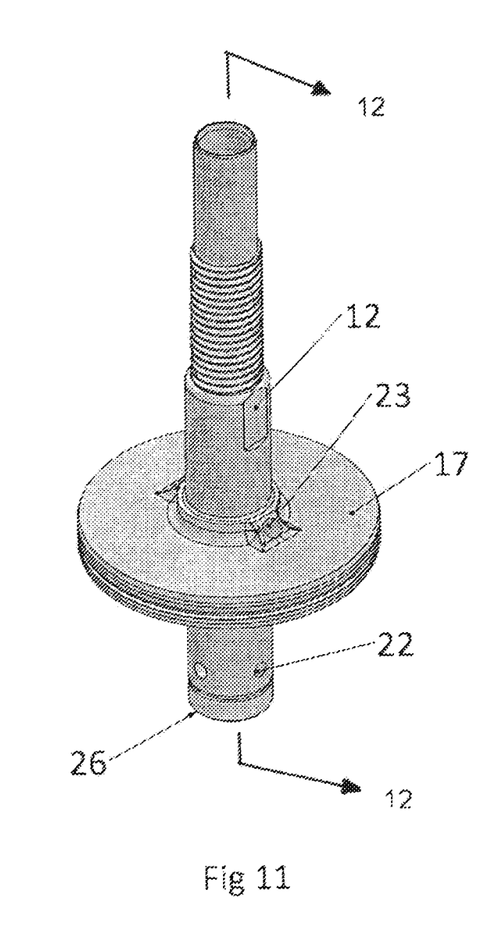
FIG. 11 is an upper side perspective view of the piston of FIG. 5 in combination with a piston stem.
Figure 12:
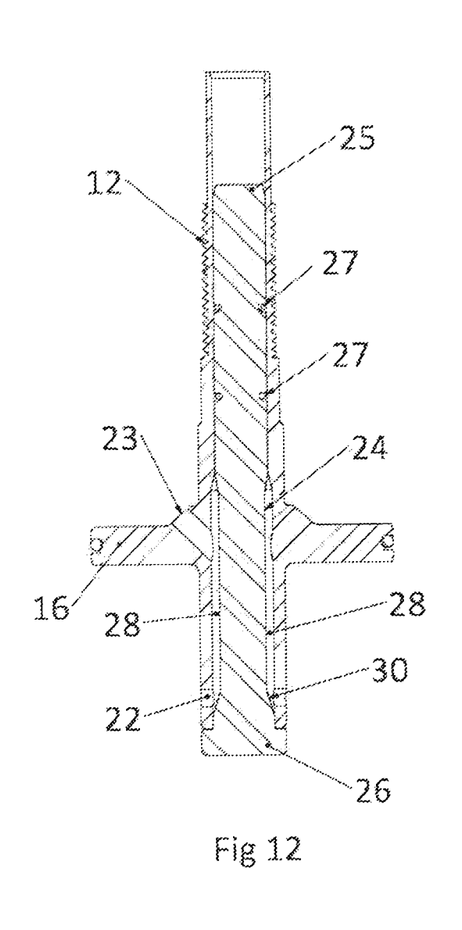
FIG. 12 is a sectional view taken along the line 12-12 of FIG. 11.

With particular reference to FIGS. 4, 11 and 12, longitudinal bore 13 of tubular housing 12 may be dimensioned to receive a piston stem 24 therein. Piston stem 24 has an upper end 25 and a lower end 26. Upper end 25 extends through longitudinal bore 13, and past disc 16, such that one or more circumferential seals 27 create a fluid-tight seal between the exterior of upper end 25 and the interior of longitudinal bore 13. Commonly, lower end 26 of piston stem 24 would have an enlarged portion that engages the lower end of tubular housing 12 and that acts as a "stop" to prevent the piston stem from being fully received within longitudinal bore 13. Lower end 26 of piston stem 24 will typically be fitted with a valve seat 35 having a seat seal 36 that engages and disengages fluid input 3 upon the turning of handle or handwheel 11 to either "open" or "close' valve 1.

In accordance with an embodiment of the invention, when received within longitudinal bore 13, a portion of the exterior surface of piston stem 24, together with a portion of the internal circumferential surface of longitudinal bore 13, forms one or more fluid passageways 28 that extend between and fluidly connect the one or more first fluid ports 22 with the one or more second fluid ports 23. Typically the fluid passageway created between the exterior of piston stem 24 and the interior surface of longitudinal bore 13 will be a generally cylindrical passageway extending about the entire surface of piston stem 24. However, in other embodiments other forms and structures of passageways that link fluid ports 22 and 23 could be utilized.

With particular reference to FIGS. 5 through 12, in accordance with an embodiment of the invention the point of intersection of disc 16 with tubular housing 12 includes one or more gussets 29. In the embodiment shown, gussets 29 are positioned at the location where the one or more second fluid ports 23 intersect the upper face 17 of disc 16. In this specific embodiment, two fluid ports 23 are shown intersecting upper face 17 of disc 16. For each of those fluid ports there are two associated gusset 29, one positioned on each side. Gussets 29 may be positioned such that they are generally parallel to the longitudinal axis of tubular housing 12, extending between the exterior of tubular housing 12 and upper face 17 of disc 16. In this manner gussets 29 tend to provide structural rigidity to disc 16, and to help to prevent and to resist the deflection of disc 16 relative to tubular housing 12 when it is subjected to fluid pressure within pressure chamber 16. That is, it will be appreciated by those skilled in the art that in some instances pressure reducing valve 1 can be exposed to very high fluid pressures and that even a slight deformation or a misalignment of disc 16 within pressure chamber 6 could result in a catastrophic failure on account of a breach of the seal between disc 16 and the internal surface of pressure chamber 6. It will also be appreciated that the existence of second fluid ports 23 may tend to create a zone of structural weakness within disc 16, and in particular at the juncture between disc 16 and tubular housing 12. Gussets 29 thus help to address any such structural weakness that may otherwise be present and help to maintain the rigidity of the piston structure.

As shown in the attached drawings, and in particular FIGS. 5 through 12, in an embodiment of the invention the one or more second fluid ports 23 may be inclined relative to upper face 17 of disc 16 by at least 45 degrees (and are thus also off-set from the longitudinal axis of tubular housing by 45 degrees). Further, lower end 26 of piston stem 24 may include a tapered face 30 on its exterior surface that is received within the lower end of longitudinal bore 13 (see in particular FIG. 12). Tapered surface 30 may be generally aligned and adjacent to one or more first fluid ports 22 within the lower end of tubular housing 12. Such a structure 30 will have a tendency to assist in directing the flow of fluid between the first and second fluid ports (22 and 23). That is, fluid that is traveling either upwardly or downwardly through fluid passageway (or fluid passageways) 28 will be transitioned between a generally horizontal flow through first fluid ports 22 to a generally vertical flow through passageway (or passageways) 28 by the assistance of tapered face 30, thereby helping to reduce turbulence and to allow for a more efficient and faster flow of fluid between the respective fluid ports. In a similar fashion, the inclined nature of second fluid ports 23 will also assist in the flow of fluid between fluid passageway (or passageways) 28 and upper portion 19 of pressure chamber 6.

From an understanding of the described structure and that shown in the attached drawings, one of ordinary skill will appreciate that an improved fluid flow pathway will exist between a position exterior to first end 14 of tubular housing 12 and a position within upper sealed portion 19 of pressure chamber 6. That improved fluid flow pathway will tend to enhance the ability of piston 7 to react more rapidly in response to pressure changes and will tend to allow for a faster reaction time for valve 1, permitting it to better accommodate rapid pressure changes between fluid input 3 and fluid output 4. The combination of an increased ability for fluid to flow between the respective compartments within valve 1 in order to accommodate rapidly changing pressures, together with the ability of spring 8 to counteract the force acting on piston 7 in order to regulate pressure, presents a more desirable functionality. The inclined nature of upper fluid ports 23, together with the nature of tapered surface 30 further helps to minimize the likelihood of dirt or debris becoming lodged within the fluid passageways and either affecting, or stopping the flow of fluid. The described structure will have a tendency to permit dirt or debris that may enter first or second fluid ports 22 or 23 to be flushed through the system rather than becoming trapped or lodged therein.

Piston 7 provides a further advantage in situations where valve 1 is exposed to freezing temperatures. The inclination of second fluid ports 23, together with the intersection of the second fluid ports with the upper surface 17 of disc 16 helps to ensure that when valve 1 is in its closed configuration fluid (which in fire protection situations will be water) self-drains from upper sealed portion 19 of pressure chamber 6 through second fluid port 23, through fluid passageway (or passageways) 28, and then through first fluid ports 22. In light of the self-draining nature of the described structure, ice is unlikely to build up and block either the first or second fluid ports 22 or 23 and/or fluid passageways 28. The tapered face 30 on the lower end of piston stem 24 also encourages water to be deflected outwardly from passageway or passageways 28. In existing pressure reducing valves, it is common for water to pool within internal passageways of the valve. If that water were to freeze, the resulting ice would block flow, and could effectively prevent operation of the pressure reducing capability of the valve. Freezing water within small internal passageways of the valve can also cause damage to valve components.

It is to be understood that what has been described are the preferred embodiments of the invention. The scope of the claims should not be limited by the preferred embodiments set forth above, but should be given the broadest interpretation consistent with the description as a whole.

It will further be understood that a number of relatively standard elements or features of valve 1 have not been described in detail above. Such features or elements are shown in the attached drawings and their structure and function would be understood and appreciated by those of ordinary skill in the art.

We claim:

1. A piston for a pressure-reducing valve, the piston comprising:
   a tubular housing having an internal longitudinal bore extending from a first end to a second end;
   an exterior circumferential sealing disc positioned along a length of the tubular housing at a distance from the first and the second ends, the sealing disc for sealing engagement with internal walls of a correspondingly shaped internal pressure chamber of the pressure reducing valve, the sealing disc having an upper face and a lower face, the upper and lower face being generally perpendicular to a longitudinal axis of the tubular housing;

one or more first fluid ports extending through the tubular housing and into the longitudinal bore at a position between the sealing disc and the first end; and one or more second fluid ports extending through the tubular housing and into the longitudinal bore at a position between the sealing disc and the second end, wherein the longitudinal bore of the tubular housing is dimensioned to receive a piston stem therein, when received within the longitudinal bore the piston stem sealingly engaging an internal surface of the longitudinal bore between the sealing disc and the second end so as to prevent the passage of fluid therebetween, when received within the longitudinal bore the piston stem, together with a portion of the internal surface of the longitudinal bore, forming one or more fluid passageways therebetween, fluidly connecting the one or more first fluid ports with the one or more second fluid ports, wherein the second fluid ports are inclined relative to the longitudinal axis of the tubular housing and extend through at least a portion of the sealing disc, intersecting at least a portion of the upper face of the sealing disc.

2. The piston as claimed in claim 1 wherein in the intersection of the sealing disc with the tubular housing includes one or more gussets at a location where the one or more second fluid ports intersect the upper face of the sealing disc.

3. A pressure reducing valve comprising the piston of claim 2.

4. The piston as claimed in claim 2 wherein the gussets extend between the tubular housing and the upper face of the sealing disc providing structural rigidity to the sealing disc at the position of intersection by the one or more second fluid ports and helping to resist deflection of the sealing disc relative to the tubular housing.

5. The piston as claimed in claim 4 wherein the one or more second fluid ports are inclined relative to the upper face of the sealing disc by at least 45 degrees.

6. In combination, the piston and the piston stem of claim 1, wherein the piston stem has a tapered face on an exterior surface that aligns adjacently with the one or more first fluid ports when the piston stem is received within the tubular housing, the tapered face assisting in directing the flow of fluid between the one or more first fluid ports and the one or more second fluid ports.

7. A pressure reducing valve comprising the combination of claim 6.

8. The combination as claimed in claim 6 wherein the intersection of the sealing disc with the tubular housing includes one or more gussets positioned at the location where the one or more second fluid ports intersect the upper face of the sealing disc.

9. A pressure reducing valve comprising the combination of claim 8.

10. The combination as claimed in claim 8 wherein the one or more gussets extend between the tubular housing and the upper face of the sealing disc providing structural rigidity to the sealing disc at the position of intersection by the one or more second fluid ports with the sealing disc, helping to resist deflection of the sealing disc relative to the tubular housing.

11. A pressure reducing valve comprising the combination of claim 10.

12. The combination as claimed in claim 10 wherein the one or more second fluid ports are inclined relative to the upper face of the sealing disc by at least 45 degrees.

13. A pressure reducing valve comprising the combination of claim 12.

14. A pressure reducing valve comprising the piston of claim 1.

* * * * *